United States Patent
Hintze-Bruening et al.

(10) Patent No.: US 10,125,269 B2
(45) Date of Patent: Nov. 13, 2018

(54) COMPOSITION BASED ON LAYERED HYDROXIDES AND POLYESTERS, PROCESS FOR PREPARING THE COMPOSITION, AND USE THEREOF

(71) Applicants: BASF Coatings GmbH, Muenster (DE); Universite Blaise Pascal Clermont-Ferrand II, Clermont-Ferrand (FR)

(72) Inventors: Horst Hintze-Bruening, Drensteinfurt (DE); Elke Austrup, Nordkirchen (DE); Fabrice LeRoux, Les Cendre (FR); Thomas Stimpfling, Merignac (FR); Claudia Swanson, Clausthal-Zellerfeld (DE); Arthur Langry, Clermont-ferrand (FR); Andrej Koenig, Muenster (DE)

(73) Assignees: BASF Coatings GmbH, Muenster (DE); Universite Blaise Pascal Clermont-Ferrand II, Clermont-Ferrand (FR)

( * ) Notice: Subject to any disclaimer, the term of this patent is extended or adjusted under 35 U.S.C. 154(b) by 0 days.

(21) Appl. No.: 15/304,400

(22) PCT Filed: Mar. 10, 2015

(86) PCT No.: PCT/EP2015/054885
§ 371 (c)(1),
(2) Date: Oct. 14, 2016

(87) PCT Pub. No.: WO2015/158466
PCT Pub. Date: Oct. 22, 2015

(65) Prior Publication Data
US 2017/0051158 A1    Feb. 23, 2017

(30) Foreign Application Priority Data

Apr. 16, 2014 (EP) .................................. 14164991

(51) Int. Cl.
| C09D 167/08 | (2006.01) |
| C09D 5/08 | (2006.01) |
| C08K 3/22 | (2006.01) |
| C08K 5/098 | (2006.01) |
| C09D 7/61 | (2018.01) |
| C09D 7/80 | (2018.01) |
| C09D 7/40 | (2018.01) |

(52) U.S. Cl.
CPC ............... *C09D 5/084* (2013.01); *C08K 3/22* (2013.01); *C08K 5/098* (2013.01); *C09D 7/61* (2018.01); *C09D 7/70* (2018.01); *C09D 7/80* (2018.01); *C09D 167/08* (2013.01); *C08K 2003/2227* (2013.01); *C08K 2003/2296* (2013.01)

(58) Field of Classification Search
None
See application file for complete search history.

(56) References Cited

U.S. PATENT DOCUMENTS

| 2010/0179249 A1* | 7/2010 | Schomaker ............. C08L 71/02 523/209 |
| 2010/0311880 A1 | 12/2010 | Tsai et al. |
| 2011/0288219 A1 | 11/2011 | Tsai et al. |
| 2012/0010360 A1 | 1/2012 | Tsai et al. |
| 2016/0208043 A1* | 7/2016 | Hintze-Bruening .... C07C 67/08 |

FOREIGN PATENT DOCUMENTS

| EP | 0 282 619 A1 | 9/1988 |
| WO | 03/102085 A2 | 12/2003 |
| WO | 2005/003408 A2 | 1/2005 |
| WO | 2009/062621 A1 | 5/2009 |
| WO | 2010/130308 A1 | 11/2010 |
| WO | 2010/130309 A1 | 11/2010 |

OTHER PUBLICATIONS

WO 2010/130309 A1 machine translation.*
International Search Report dated Jun. 2, 2015 in PCT/EP15/054885 Filed Mar. 10, 2015.

* cited by examiner

*Primary Examiner* — Ana L. Woodward
(74) *Attorney, Agent, or Firm* — Oblon, McClelland, Maier & Neustadt, L.L.P.

(57) ABSTRACT

The present invention relates to a composition comprising (A) at least one carboxy-functional polyester having an acid number in the range from 20 to 250 mg KOH/g, prepared using at least one difunctional monomer (a1) with aliphatic groups having 12 to 70 carbon atoms between the functional groups, and also (B) at least one synthetic layered hydroxide, where the at least one layered hydroxide (B) is prepared in the presence of the polyester (A). The present invention further relates to the preparation of the composition and also to the use of the composition as coating material.

17 Claims, 5 Drawing Sheets

COMPOSITION BASED ON LAYERED HYDROXIDES AND POLYESTERS, PROCESS FOR PREPARING THE COMPOSITION, AND USE THEREOF

CROSS REFERENCE TO RELATED APPLICATION

This application is a National Stage entry under 35 USC 371 of PCT/EP2015/054885, filed on Mar. 10, 2015, and claims priority to European Patent Application No. 14164991.3, filed on Apr. 16, 2014.

The present invention relates to new compositions based on layered hydroxides and polyesters. The present invention further relates to the preparation of such compositions and to the use of the composition in or as coating material. The new compositions comprise layered hydroxides in finely divided form and without excessive aggregation. This means that the advantageous properties of layered hydroxides in coating materials, such as the improvement of corrosion control and/or stonechip resistance, can be utilized without other, deleterious properties resulting, more particularly an aggregation-induced inhomogeneity in the coating film.

PRIOR ART

Layered hydroxides, various performance properties of these layered hydroxides, and their use in coating materials, paints for example, are known. The layered hydroxides include more particularly the layered double hydroxides (abbreviated hereinbelow to LDH) and also the layered single hydroxides (abbreviated hereinbelow to LSH).

One relevant group of LDH is described in the literature frequently by the idealized general formula $[M2^{2+}_{(1-x)}M3^{3+}_{x}(OH)_2]^{x+}[A^{y-}_{(x/y)}.nH_2O]$ or similar empirical formulae. M2 therein stands for divalent metallic cations, M3 for trivalent metallic cations, and A for anions of valence x. In the case of the naturally occurring LDH, the anions in question are generally inorganic anions such as carbonate, chloride, nitrate, hydroxide and/or bromide. The most common anions are carbonate, sulfate, chloride, and hydroxide. Also known are LDH comprising sulfide and $[Sb(OH)_6]^-$ (see Mineralogical Magazine, October 2012. v. 76. p. 1289). Various other inorganic and also organic anions may be present as well, especially in synthetic LDH described later on below. In the general formula above, moreover, account is taken of the water of crystallization present. One known class of LDH are the hydrotalcites. In the hydrotalcites, $Mg^{2+}$ is present as divalent cation, $Al^{3+}$ as trivalent cation, and carbonate, fundamentally, as anion. In synthetic hydrotalcites, in particular, the carbonate may have been at least proportionally substituted by hydroxide ions or by other inorganic and also organic anions. Hydrotalcites or LDH have a layerlike structure similar to brucite $(Mg(OH)_2)$, in which, between two inorganic metal hydroxide layers, that carry a positive charge on account of the trivalent metal cations proportionally present, there is in each case a negatively charged layer of intercalated anions, this layer generally further comprising water of crystallization. In other words there are positively and negatively charged layers present in alternation, forming a layer structure as a result of corresponding ionic interactions. In the formula shown above, the LDH layer structure is taken into account by means of the correspondingly placed brackets. Methods for producing LDH, as for example the direct coprecipitation method, are known to the skilled person and are also described later on below.

Likewise known, for example, are synthetic LDH in which instead of a combination of divalent and trivalent metallic cations there is a combination of monovalent metallic cations (for example, $Li^+$) and trivalent metallic cations (for example, $Al^{3+}$) present in the metal hydroxide layers. These LDH as well can be prepared, for example, via the aforementioned coprecipitation method, specifically via the coprecipitation of aluminum hydroxide (gibbsite or bayerite) in the presence of lithium salts in an aqueous medium. Their structure resembles the aforementioned hydrotalcites in terms of the positively charged metal hydroxide layers and the negatively charged interlayers. One known representative of these LDH may be described via the formula $[LiAl_2(OH)_6]^+[A.nH_2O]$. In this case, lithium cations fill the unoccupied lattice positions in the layered aluminum hydroxide. The result of this is a corresponding positive layer charge, compensated by anions. These anions are located in intercalated form between the positively charged metal hydroxide layers.

The LSH, as is known, are layer structure components which are related to the LDH but do not have two metallic cations with different valences in the inorganic metal hydroxide layers, instead possessing merely divalent metallic cations as a cationic component. The above-described positive charge excess, which in the case of the LDH is generated by the trivalent metallic cations and which is necessary for the alternating positive-negative layer sequence, is generated here by statistically arising pairings of free lattice position in the metal hydroxide layer (X/Y plane) with two tetrahedrally coordinated cations adjacent in the Z direction (above and below the plane of the layer). In this respect, these LSH differ from other layered, electrically neutral metal hydroxides such as magnesium hydroxide (brucite). Examples are the hydroxides of Zn, Co, Ni, and Cu, or hydroxides with mixed divalence, as for example Zn/Ni.

Important characteristics of layered hydroxides are, accordingly, a pronounced structural anisotropy and the fact that between two adjacent metal hydroxide layers in each case there are agents intercalated by noncovalent, ionic and/or noncovalent polar interactions. These agents may be, for example, the aforementioned inorganic anions, more particularly carbonate, and also water. Likewise possible, however, is the intercalation of further inorganic and organic agents, more particularly anions, it being possible for these agents either to be incorporated directly during preparation of the layered hydroxides and/or to be introduced by an anionic exchange reaction method into layered hydroxides that have already been prepared.

The fact that the layered hydroxides exhibit the described structural anisotropy and, moreover, the possibility exists of integrating different anions into the layered hydroxides in the ways described has led to a very wide variety of uses and applications for these systems, especially of LDH. One central technical field here is the sector of coating materials or paints.

For instance there are approaches in which LDH are incorporated into coating materials based on polymeric binders (examples being primers, surfacers, and aqueous basecoat materials), in which they lead to a variety of performance properties, as for example to an increased corrosion control and/or increased mechanical resistance, more particularly an increased stonechip resistance. Also known is their use for the deliberate influencing of optical properties, such as in aqueous effect basecoat materials. The interaction of structural anisotropy and the consequent barrier effect and also the chemical adaptability is thus exploited here. Thus, for example, corrosion protection agents in anionic form are intercalated into the anionic layers of hydrotalcites and/or LDH, and the LDH therefore contribute to the corrosion control. LDH comprising typical inorganic anions, for example carbonate, may also improve corrosion control, however.

Accordingly, WO 03/102085 describes synthetic hydrotalcite components or layered double hydroxides (LDH) comprising exchangeable anions, and the use thereof in coating materials for improving the corrosion control of aluminum surfaces. The layered double hydroxides therein are described by the idealized general formula already indicated earlier on above $[M2^{2+}_{(1-x)}M3^{3+}_{x}(OH)_2]^{x+}$ $[A^{x-}.nH_2O]$. Preferred metal cations are the hydrotalcite cations magnesium(II) and aluminum(III). Anions described are, for example, nitrate, carbonate or molybdate, and also the chromium-containing anions chromate and dichromate.

Further hydrotalcite components or LDH and the use thereof as corrosion control agents in coating materials based on organic polymeric binders are described in EP 0282619 A1, WO 2005/003408 A2 or ECS Transactions, 24 (1) 67-76 (2010), for example. In these cases, as well as the above-described inorganic anions, organic anions are employed as well, such as salicylate, oxalate, DMTD (2,4-dimercapto-1,3,4-thiadiazole) and its derivatives, anions obtainable from EDTA, or benzotriazolate, for example.

WO 2009/062621 A1 likewise describes the use of LDH comprising organic anions in coating materials for producing stonechip-resistant OEM coat systems in automobile finishing. As is known, such OEM coat systems generally consist of a corrosion control coating (more particularly a cathodic electrocoat), a surfacer coat, a basecoat, and a concluding clearcoat. The LDH are used in the surfacer coat. As well as a high stonechip resistance, this surfacer coat exhibits effective adhesion to the underlying cathodic electrocoat and the overlying basecoat, and, moreover, has good surfacer properties (concealing the structure of the substrate).

WO 2010/130308 A1 describes the use of LDH in aqueous effect basecoat materials based on a specific polyester, with the finishes produced from them having advantageous optical properties. Achieved more particularly is high brightness of the finish in conjunction with retention of the flop effect.

One disadvantage of the known LDH-containing coating materials is that the anisotropic layered hydroxides generally tend toward agglomeration—that is, in the coating material and in the coating produced from it, the LDH are often not homogeneously distributed, but instead tend to form agglomerates. Such agglomerates may of course critically disrupt the development of a homogeneous coating film and of its properties. The agglomerates are also formed irrespective of whether the LDH, before being used in a coating material, are obtained in powder form or are ground correspondingly. Within the coating material, the LDH structures undergo reorganization to form, for example, enlarged layer structure complexes again. This agglomeration occurs particularly with carbonate-based LDH, since the carbonate anion, as the anion which is also present in the natural hydrotalcite components, has probably the greatest binding affinity to the metal hydroxide layers and therefore promotes agglomeration or formation of pronounced positive-negative layer structures. It is true that the replacement of the carbonate with other anions as described above, such as with inorganic or organic, corrosion-inhibiting anions, for example, is often desirable, and so at the same time it is possible to alleviate the above-described agglomeration effect of the carbonate. This effect, however, even in attenuated form, is of course also present on intercalation of other anions, and so in this case as well there is often no satisfactory suppression of the agglomeration effect.

A further problem when using layered hydroxides which include anions other than carbonate is that the corresponding anions in the coating materials, examples being corrosion-inhibiting agents or anions which are used to lower the agglomeration effect, may be successively replaced by carbonate—meaning that they may be displaced by the carbonate under thermodynamic control. While this effect occurs hardly at all in coatings which have already been cured (and are therefore metastable), it is nevertheless possible, especially in waterborne coating materials. As a result, not only is the unwanted agglomeration promoted in turn; instead, there is also release from the layered hydroxides of in general monomeric anions, which are supposed to be released, if at all, only in particular situations, such as the damaging of a coating and the then-desired availability of corrosion-inhibiting agents, for example. Absent such damage, the release is unwanted, and may instead lead to unpredictable incompatibilities. For example, as plasticizing and hydrophilic constituents, these released ions may affect the barrier function of the coating, and may lead to increased moisture-induced swellability and also, possibly, to delamination (if, for example, these agents migrate into adjacent coats).

The effect of the release or efflorescence is especially pronounced when coating materials which comprise layered hydroxides additionally comprise polymeric binders which themselves contain (potentially) organic anionic groups, more particularly carboxyl groups and/or carboxylate groups. In this case, the carboxylate groups may displace the organic anions from the LDH and thus give rise to particularly pronounced incompatibilities. The only alternatives then remaining are the carbonate-containing LDH, which are deleterious in turn on account of the agglomeration.

As is known, however, specifically carboxy-functional polymeric binders, especially polyesters, are highly relevant, since such binders are particularly suitable for the production of waterborne systems, for example.

Even in nonwaterborne systems, however, the chemical construction of polymeric binders, such as polyesters, means frequently that carboxyl groups are present.

The problems outlined also exist, of course, in mixtures which cannot yet be identified as an actual coating material or paint, but which already include layered hydroxides and polymeric binders, especially (potentially) anionic polyesters, and which are amenable to conversion into coating materials by addition of further constituents, examples being typical crosslinking agents and/or typical additives.

Problem

A problem addressed by the present invention was accordingly that of providing a composition which no longer has the disadvantages of the prior art but instead comprises LDH in finely divided form and more particularly without pronounced agglomeration. It ought in particular to be possible, using the composition, to employ LDH in coating materials, especially in waterborne coating materials, and to avoid the known agglomeration and efflorescence effects. At the same time it ought to be possible, using the composition, to provide coating materials which comprise (potentially) anionic binders, more particularly carboxyl-containing binders, and in which nevertheless the stated deleterious effects occur only to a minor extent, or not at all.

Solution

A new composition has been found, comprising
(A) at least one carboxy-functional polyester having an acid number in the range from 20 to 250 mg KOH/g, prepared using at least one difunctional monomer (a1) with aliphatic groups having 12 to 70 carbon atoms between the functional groups,
and also
(B) at least one synthetic layered hydroxide,
wherein the at least one layered hydroxide (B) is prepared in the presence of the polyester (A).

The new composition is also referred to below as composition of the invention. Preferred embodiments of the composition of the invention can be found in the description below and also in the subclaims.

Additionally provided by the present invention is a process for preparing the composition of the invention, by preparing, in the presence of
(a) at least one carboxy-functional polyester (A) having an acid number in the range from 20 to 250 mg KOH/g, prepared using at least one difunctional monomer (a1) with aliphatic groups having 12 to 70 carbon atoms between the functional groups,
(b) at least one synthetic layered hydroxide.

Likewise provided by the present invention is the use of the composition of the invention as coating material or for producing a coating material.

In particular it has been found that the layered hydroxides present in the composition of the invention possess a substantially finer distribution than is the case in prior-art systems which as well as layered hydroxides also comprise carboxy-functional binders, more particularly polyesters. The compositions of the invention therefore differ at a structural level from the compositions of the prior art. The composition may therefore be employed outstandingly as coating material or for producing coating materials which as well as the two constituents (A) and (B) also include further, typical coatings constituents. Examples include crosslinking agents, further, typical polymeric binders which may comprise (potentially) anionic groups or else may be free from these groups, and further, typical coatings additives.

DETAILED DESCRIPTION

The Polyester (A)

The composition of the invention comprises at least one specific carboxy-functional polyester (A).

A polyester, as is known, is a polymeric organic compound prepared using polyhydric organic alcohols and polybasic organic carboxylic acids. These alcohols and carboxylic acids are linked with one another by esterification, in other words by means of condensation reactions. The polyesters are correspondingly assigned in general to the group of the polycondensation resins. The polyesters may be prepared using, as is known, instead of or in addition to the corresponding organic carboxylic acids, the anhydrides of the carboxylic acids, more particularly the anhydrides of the dicarboxylic acids. In the context of the present invention, therefore, the term "anhydride" means a carboxylic anhydride. Likewise possible is preparation through the use of hydroxycarboxylic acids or the lactones, which are derived from the hydroxycarboxylic acids by intramolecular esterification.

The polyesters (A) used for preparing the compositions of the invention are those prepared using at least one difunctional monomer (a1) with aliphatic groups having 12 to 70 carbon atoms between the functional groups.

Monomers used in preparing the polyesters (A) are, for the purposes of the present invention, all individual starting compounds which are used in the preparation of these polyesters (A) and whose basic structures are incorporated into the polyester. These are, for example, typical monomeric compounds having two corresponding functional groups, such as 1,6-hexanediol, for example. As starting compounds for preparing polyesters it is also known, however, to be possible to use compounds which have themselves already been prepared by linkage of two or more individual molecules, such linkage being possible in any of a very wide variety of different ways. Reference may be made, for example, to the dimeric fatty acids described below. Even these compounds, however, are identified as starting compounds, which are incorporated into the polyester by means of corresponding polymerization reactions and which then make up a non-independent component of the polyester. These starting compounds as well, accordingly, are termed monomers.

Aliphatic compounds are known to be acyclic or cyclic, saturated or unsaturated hydrocarbon compounds which are not aromatic. For the purposes of the present invention, then, aliphatics are aliphatic hydrocarbon compounds, these being compounds consisting of carbon and hydrogen. The term "aliphatic compound" encompasses acyclic and cyclic aliphatics, and is taken to be a corresponding generic term in the context of the present invention as well. The acyclic aliphatics may be linear or branched. Linear in this context means, as is known, that the compound in question has no branches with regard to the carbon chain, the carbon atoms instead being arranged exclusively in a linear sequence in a chain. Branched or nonlinear therefore means, in the context of the present invention, that the compound under consideration in each case has branching in the carbon chain—in other words, in contrast to what is the case for the linear compounds, at least one carbon atom in the compound in question is a tertiary or quaternary carbon atom. Cyclic aliphatics or cycloaliphatics are those compounds in which at least some of the carbon atoms present are linked in the molecule in such a way that one or more rings are formed. Besides the one or more rings, of course, there may be further acyclic linear or branched aliphatic groups present in a cycloaliphatic compound.

An aliphatic group, therefore, is a group which fulfills the requirements set out above for the aliphatic compounds, but is only part of a molecule. Besides the aliphatic group, the molecule in question also contains other groups such as, for example, functional groups. Functional groups for the purposes of the present invention are terminal groups which contain heteroatoms such as oxygen, sulfur and/or nitrogen, examples being hydroxyl groups or carboxyl groups. Also present in such molecules, of course, may be bridging heteroatoms or bridging groups containing heteroatoms. Ether bonds may be cited as an example.

Monomers with aliphatic groups between functional groups is a term used accordingly for those monomers which in addition to the corresponding functional groups have aliphatic groups disposed between the functional groups. The monomers therefore consist of corresponding functional groups and aliphatic groups, thus containing only the (terminal) functional groups and the aliphatic groups.

The functional groups of the difunctional monomers (a1) are evidently groups capable of forming ester bonds, in other words, more particularly, hydroxyl groups and/or carboxylic acid groups and also anhydride groups. The monomers (a1) are therefore preferably diols, dicarboxylic acids and/or hydroxycarboxylic acids, and also anhydrides.

The aliphatic groups of the monomers (a1) possess 12 to 70, preferably 13 to 50, and more preferably 14 to 40 carbon atoms.

The fraction of the monomers (a1) used for preparing the polyesters (A) may vary widely according to each individual case. It is possible, for example, to prepare a polyester (A) using dimeric fatty alcohols (a1) and dimer fatty acids (a1) as described with greater precision later on below. It is also possible to use a significant or even predominant fraction of other monomers, provided monomers (a1) are used at any rate. It is preferable for at least 5 mol % of monomers (a1) to be used in preparing the polyesters (A), based on the total amount of the monomers used in preparing the polyester (A). In one embodiment of the present invention the fraction may be from preferably 5 to 70 mol %, especially preferably 6 to 66 mol %, very preferably 7 to 62 mol % of the monomers (a1). In a further preferred embodiment, for example, at least 80 mol %, preferably at least 90 mol %, more particularly at least 95 mol % of monomers (a1) are used. In this embodiment the polyester (A) is obtained preferably by reaction of aliphatic dimer fatty acids (a1) and dimeric aliphatic fatty alcohols (a1). Since the dimer fatty acids (a1) used in general are present, as commercial products, usually in the form of mixtures, which also include small fractions, specified with greater precision later on below, of nonaliphatic dimer fatty acids, a polyester (A) is obtained in this embodiment that consists exclusively of monomers (a1), apart from this small fraction of nonaliphatic dimer fatty acids.

Particularly preferred monomers (a1) are, for example, fully hydrogenated bisphenols, an example being the fully hydrogenated bisphenol A. Equally preferred are dimeric aliphatic fatty alcohols and/or dimeric aliphatic fatty acids, among which the dimeric aliphatic fatty acids are preferred. Especially preferred for the purposes of the present invention are dimeric aliphatic fatty acids having 24 to 40 carbon atoms and also fully hydrogenated bisphenol A.

Dimeric aliphatic fatty acids are preparable by catalytic dimerization of unsaturated, plant-derived fatty acids, the unsaturated fatty acids containing 18 carbon atoms being employed more particularly in the preparation, the product thus having 36 carbon atoms in all. Linking proceeds primarily in accordance with the Diels-Alder type, and results in mixtures of, for example, cycloaliphatic and linear-aliphatic dimeric fatty acids, which may be saturated or unsaturated depending on mechanism and/or on optional subsequent hydrogenation. As well as the aliphatic adducts (a1), these mixtures usually also include certain fractions of aromatic and/or mixed aliphatic-aromatic groups. Dimeric aliphatic fatty alcohols are obtained generally by reduction of dimeric fatty acids, in the course of which the aromatic groups as well may be reduced. Generally speaking, accordingly, aliphatic dimeric fatty alcohols contain no fractions of the aromatic groups described.

Accordingly, as well as the monomers (a1), the polyesters (A) are also preferably prepared using difunctional monomers (a2), which likewise contain 12 to 70 carbon atoms, preferably 13 to 50, and more preferably 14 to 40 carbon atoms between the functional groups, but which, however, are not purely aliphatic, but instead are at least proportionally aromatic as well. With preference, therefore, these groups are mixed aliphatic-aromatic groups, meaning that the groups with 12 to 70 carbon atoms include aliphatic and aromatic moieties. The fraction of these monomers (a2) as a proportion of the monomers used for preparing the polyester (A) may therefore vary according to whether, for example, dimeric fatty acids are used as monomers (a1) and/or on the proportion in which dimeric fatty acids are used among the monomers (a1). Indeed, if dimeric fatty acids are used, as is preferred, it is generally the abovementioned mixtures which are employed for this purpose, meaning therefore that monomers (a2) are present as well. If dimeric fatty acids are not used, but instead, for example, only hydrogenated bisphenol A and/or dimer diols are used, then there are generally also no monomers (a2) present. Preferably, however, at any rate, dimeric aliphatic fatty acids are used, very preferably both dimeric aliphatic fatty acids and hydrogenated bisphenol A.

The molar ratio of purely aliphatic dimeric fatty acids to nonaliphatic dimeric fatty acids in the above-described mixtures prepared by catalytic dimerization is generally 2 to 10.

Accordingly the monomers (a2), based on the total amount of the monomers used in preparing the polyester (A), are employed in fractions of for example 0 to 10 mol %, preferably 0.5 to 5 mol %, in preparing the polyester (A), the amount being influenced in particular by the criteria specified above.

The stated dimeric fatty acids or monomers (a1) may be obtained in corresponding mixtures with monomers (a2) as commercial products. Particular examples include the dimeric fatty acids of the Pripol® series from Unichema.

Further building blocks which can be used in preparing the polyester (A) are preferably the following monomers:

(a3) linear aliphatic and/or cycloaliphatic diols having 2 to 11 carbon atoms, such as, in particular, ethylene glycol, diethylene glycol, 1,3-propanediol, dipropylene glycol, 1,4-butanediol, 1,6-hexanediol, 1,4-cyclohexanediol and/or 1,4-dimethylolcyclohexane, very preferably 1,4-butanediol and/or 1,6-hexanediol, these diols, in preparing the polyester (A), being used preferably in fractions of, for example, 0 to 40 mol %, preferably 0 to 35 mol %, based on the total amount of the monomers used in preparing the polyester (a1), (a4) branched aliphatic diols having 4 to 11 carbon atoms, such as, in particular, neopentyl glycol, 2-methyl-2-propylpropanediol, 2-ethyl-2-butylpropane-diol, 2,2,4-trimethyl-1,5-pentanediol, 2,2,5-trimethyl-1,6-hexanediol, very preferably neopentyl glycol, these diols being used, in preparing the polyester (A), preferably in fractions of, for example, 0 to 45 mol %, preferably 0 to 40 mol %, based on the total amount of the monomers used in preparing the polyester (A), (a5) linear aliphatic, cycloaliphatic and/or aromatic dicarboxylic acids having 4 to 13 carbon atoms, such as, in particular, oxalic acid, malonic acid, succinic acid, glutaric acid, adipic acid, sebacic acid, maleic acid, fumaric acid, isophthalic acid, terephthalic acid, orthophthalic acid, tetra-hydrophthalic acid, hexahydrophthalic acid, 1,4-cyclohexanedioic acid, and/or their anhydrides, very preferably hexahydrophthalic acid, these dicarboxylic acids being used, in preparing the polyester (A), preferably in fractions of, for example, 5 to 30 mol %, preferably 10 to 25 mol %, based on the total amount of the monomers used in preparing the polyester (A), optionally further difunctional monomers (a6) having for example 12 to 70 carbon atoms and comprising for example bridging heteroatoms and/or bridging groups containing heteroatoms, in fractions of, for example, 0 to 10 mol %, based on the total amount of the monomers used in preparing the polyester (A), optionally monomers (a7), different from the monomers (a1) to (a6), these monomers (a7) being, for example, only monofunctional, in other words containing only one hydroxyl group or one carboxylic acid group, or having, for example, more than two functional groups, as for example three functional groups. Also possible of course are monomers (a7) which contain one free carboxylic acid group and one anhydride group, an example being benzenetricarboxylic anhydride. This monomer is of course likewise formally equipped with three functional groups, since the anhydride group is difunctional in relation to the linkages possible therefrom. Equally possible as monomers (a7) are, for example, hydroxycarboxylic acids, and other monomers known to the skilled person in this context. Such monomers (a7) are present for example in fractions of 0 to 10 mol %, based on the total amount of the monomers used in preparing the polyester (A).

The polyester (A) is carboxy-functional and has an acid number of 20 to 250, preferably 25 to 175, very preferably of 30 to 150 mg KOH/g. For the purposes of the present invention, the acid number is measured in accordance with DIN EN ISO 3682.

The OH number of the polyester (A) may vary widely according to the monomers used and/or the reaction conditions selected during preparation, and is situated, for example, in the range from 0 to 200, preferably 0 to 150, very preferably from 0 to 100 mg KOH/g. Depending on the specific use planned for the composition of the invention, it may be of advantage for a certain amount of hydroxyl groups to be available, for the purpose, for example, of chemical crosslinking with a crosslinker in a coating material. In one preferred variant of the invention, accordingly, the OH number is situated in the range from 40 to 200, more particularly 60 to 150 mg KOH/g. It may alternatively be appropriate for the polyester to contain few or no OH groups. In a further preferred variant, accordingly, the OH number is situated in the range from 0 to 50, preferably 0 to 25 mg KOH/g. The OH number is measured according to DIN 53240. For the purposes of the present invention, the statement of an OH number or acid number for a polymer should always be understood as relating to the corresponding nonvolatile fraction (determined in accordance with DIN ISO 3251 with an initial mass of 1.0 g of reaction mixture for a test duration of 60 minutes at a temperature of 125° C.). Any reference in the context of the present invention to an official standard is of course to the version of the standard valid at the filing date or, if there is no version valid at that point in time, then to the last valid version.

The number-average molecular weight of the polyester (A) may vary widely and is situated for example in the range from 500 to 20 000 g/mol. The weight-average molecular weight as well is a parameter which is not critical per se, and is situated, for example, in the range from 1000 to 30 000 g/mol. For the purposes of the present invention, the molecular weights are determined by means of GPC analysis using THF (+0.1% acetic acid) as eluent (1 ml/min) on a styrene-divinylbenzene column combination. The calibration is performed using polystyrene standards.

The preparation of the polyesters (A) and hence the reaction of the monomers takes place in accordance with the widely known methods of polyester chemistry, the skilled person likewise being aware of how the conditions must be selected in order, for example, to obtain the abovementioned preferred properties, such as OH number and acid number.

The reaction may take place, for example, in bulk or in solution with typical organic solvents, at temperatures of, for example, 50° C. to 300° C., preferably 100° C. to 290° C., more particularly 140° C. to 280° C. Through reaction temperatures of more than 140° C. in particular it is possible to ensure that with simultaneous use of anhydrides and free carboxylic acids there is also an effective reaction of free carboxylic acids, in other words an effective incorporation of the corresponding monomers into the polyester scaffold. It will be appreciated that typical catalysts can also be employed, such as sulfuric acid and/or tetraalkyltitanates, zinc alkoxylates and/or tin alkoxylates, dialkyltin oxides, or organic salts of the dialkyltin oxides.

In one particular embodiment of the present invention a polyester (A) is used which is preparable by ring-opening reaction of at least one anhydride of the formula (I)

where $R_1$=H, $C_1$ to $C_{24}$ alkyl or $C_2$ to $C_{24}$ alkenyl
with
at least one linear, hydroxy-functional polyester (AA) prepared using 7 to 95 mol %, based on the total amount of the monomers used in preparing the polyester (AA), of at least one difunctional monomer (a1) with aliphatic groups having 12 to 70 carbon atoms between the functional groups.

As the skilled person is aware, a reaction of this kind between an anhydride and a hydroxyl group takes place with formation of an ester bond and of a carboxyl group. The linear hydroxy-functional polyester (AA), preferably a dihydroxy-functional polyester (AA), is therefore modified, with formation of an ester bond, with a corresponding carboxy-functional terminal group, to form a polyester (A) for use in accordance with the invention.

In the context of the present invention, therefore, the expression "ring-opening reaction" is understood to mean that apart from specifically this ring-opening reaction, no further reactions occur, i.e., more particularly, no further reactions of the carboxylic acid groups, formed by the ring-opening reaction, with further molecules, still present in the reaction mixture, of the hydroxy-functional component (AA). As the skilled person is aware, a condensation reaction of this kind, with formation of a further ester bond, would in principle be possible. Any such further reaction, however, may be readily prevented, in a way likewise known to the skilled person, through appropriately adapted reaction regime. As is known, an anhydride, owing to the ring tension and to the consequent higher energy release on reaction with a hydroxyl group, has a higher reactivity than a free carboxylic acid group. Thus, for example, it is possible to operate at reaction temperatures which permit the ring-opening reaction but do not permit any further condensation reactions. Moreover, through the deliberate use or deliberate omission, more particularly the omission, of catalysts, examples being typical acid catalysts or dibutyltin laurate, the desired reaction regime can be ensured. Moreover, the addition or omission of water or the use of water separators, for example, is known to have influence on the different reactivities, since while water is released in the typical condensation reaction between carboxylic acid and alcohol, this is not the case for the reaction of anhydride and alcohol. The skilled person knows how to adapt these conditions accordingly.

The ring-opening reaction of the invention therefore produces a polyester (A) which comprises carboxylic acid groups, or additional carboxylic acid groups. The polyester or diester derivative of the invention preferably has such carboxy-functional groups at both ends.

This means, therefore, that in the course of the reaction, preferably, component (AA), and/or the molar ratio of the anhydride used to the hydroxyl groups of component (AA), is selected such that the resulting polyester (A) carries corresponding carboxy-functional groups at both ends. Such a polyester (A) preferably possesses precisely two carboxylic acid groups per molecule.

It is preferable, accordingly, in such polyesters (A), for the molecular unit originating from the polyester (AA) to be located in the core or in the center of the polyester (A), while the molecular units originating from the anhydride are present in the form of side groups and/or end groups. With particular preference the polyesters (A) have precisely two end groups that are based on the anhydride. This therefore means in particular that component (AA) preferably has two terminal hydroxyl groups. These groups may then both react with the anhydride (A). As described earlier on above, component (AA), just like the polyester (A), comprises specific aliphatic groups having at least 12 carbon atoms. The consequent hydrophobic character of component (AA) then contributes to a particular amphiphilic character, with the anhydride molecules attached terminally on both sides or with the two corresponding free carboxyl groups, which account for a hydrophilic character. Whereas the more hydrophobic unit is located in the center of the molecule, both terminal, opposite side groups are hydrophilic. In the context of the present invention, these specific polyesters (A) have very particular advantages in terms of the fine division of the LDH.

As the skilled person is aware, the abovementioned reactions and reaction regimes, for purely statistical reasons, also produce products which do not have the idealized structure described. Generally, for example, byproducts are likely which form through a further reaction of the resultant polyesters (A) with molecules of polyesters (AA) that are still present, or products which are functionalized on only one side in spite of the preferred two-sided functionalization. There will also be unreacted starting components in the reaction mixture. In spite of this, the polyesters (A) described can be readily obtained as main product by means of the described reaction regime. These derivatives can also be used without further purification.

The ring-opening reaction of the anhydride of formula (I) with the component (AA) may take place by different methods known to the skilled person, with observance of the above-described prevention of the further reaction of the resulting polyester (A) with molecules of the hydroxy-functional component (AA). The reaction may take place, for example, in bulk or in solution, preferably in solution with organic solvents such as 4-methyl-2-pentanone or other common solvents, at temperatures of, for example, 50° C. to 200° C., preferably 60° C. to 150° C., more particularly 65° C. to 100° C. Through reaction temperatures of below 100° C., in particular, it is possible effectively to prevent further reaction of polyesters (A) with molecules of the hydroxy-functional component (AA). It is of course also possible to use typical catalysts such as sulfuric acid or dibutyltin laurate, although the omission of such catalysts is advantageous in order to prevent the aforementioned further reaction. The polyester and diester derivatives may be obtained, for example, as a reaction mixture with organic solvents, or as solid resins or as oils, following distillation of organic solvents optionally employed.

The preferred amphiphilic polyesters (A) described have an OH number, within the preferred ranges specified above, more particularly of 0 to 50, very preferably of to 25 mg KOH/g. The acid number of these polyesters (A) is preferably higher, as a result of the carboxyl groups resulting from the anhydride, and is situated more particularly in the range from 60 to 250, preferably from 80 to 200, very preferably from 90 to 150 mg KOH/g. The measurement methods have been described earlier on above.

In accordance with the methods described above, and using the monomers described above, the polyesters (AA) used for preparing these polyesters (A) can be readily prepared. It should be ensured here that the polyester (AA) is linear, and hence in particular that difunctional monomers are used for the preparation, and not monomers containing more than two functional groups. As indicated above, the polyesters (AA) preferably possess two terminal OH groups, in order then to react preferentially with two anhydride molecules, with ring opening. The OH number of the polyester (AA) is preferably from 80 to 200, more preferably from 100 to 190, very preferably from 120 to 180 mg KOH/g. After the reaction, the above-stated carboxy functionality and the other possibly preferred parameters are obtained, more particularly the OH number, the acid number, and the molecular weight. The way in which the skilled person prepares the polyesters (AA) is therefore part of the general art knowledge.

For the anhydride, $R_1$=H, $C_1$ to $C_{24}$ alkyl, $C_2$ to $C_{24}$ alkenyl, preferably H, $C_6$ to $C_{20}$ alkyl, $C_6$ to $C_{20}$ alkenyl, more preferably H and $C_6$ to $C_{20}$ alkenyl, and particularly advantageously $C_6$ to $C_{20}$ alkenyl.

The Layered Hydroxide (B) and the Production of the Composition According to the Invention The composition according to the invention comprises at least one layered hydroxide (B), the layered hydroxide being prepared in the presence of at least one polyester (A).

Layered hydroxides, more particularly layered double hydroxides (LDH), are known.

One relevant group of LDH may be described by the following general formula (II):

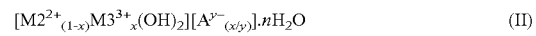

$$[M2^{2+}_{(1-x)}M3^{3+}_{x}(OH)_2][A^{y-}_{(x/y)}]\cdot nH_2O \quad (II)$$

where $M2^{2+}$ stands for divalent metallic cations, $M3^+$ for trivalent metallic cations, and $A^{y-}$ for anions of average valence y. By average valence in the context of the present invention is meant the mean valence value of the possibly different anions incorporated. As the skilled person will readily appreciate, different anions which are different in their valence (for example, carbonate, nitrate, anion obtainable from EDTA, etc.) may contribute to an individual average valence in each case, according to their respective proportion in the total amount of anions (weighting factor). For x, values from 0.05 to 0.5 are known, whereas the fraction of water of crystallization, with values of n=0 to 10, may be very different. The divalent and trivalent metal cations and also hydroxide ions are present in a regular arrangement of edge-linked octahedra in the positively charged metal hydroxide layers (first bracketed expression in formula (II)) and the intercalated anions are present in the respective negatively charged interlayers (second bracketed expression in formula (II)); in addition, water of crystallization may be present.

Also possible are LDH in which, for example, only monovalent metallic cations are used, instead, for example, of divalent metallic cations; these LDH may then have different stoichiometries in terms of the different metallic cations and of the anions. Reference may be made, for example, to the metal cation combination $Li^+/Al^{3+}$. The stoichiometry existing in such LDH in the metal hydroxide layers is described by the empirical formula $LiAl^{3+}{}_2(OH)_6$.

LSH may likewise be used as layered hydroxides, more particularly layered hydroxides of $Zn^{2+}$, $Co^{2+}$, $Ni^{2+}$, and $Cu^{2+}$.

The layered hydroxides employed with preference in the context of the present invention, more particularly LDH and LSH, therefore comprise one kind of a metallic cation or two different kinds of metallic cations. Whereas the LSH comprise one kind of a divalent metallic cation, $Zn^{2+}$ for example, or two different divalent metallic cations, the LDH comprise, for example, a divalent metallic cation and a trivalent metallic cation, or a monovalent metallic cation and a trivalent metallic cation.

The composition of the invention preferably comprises layered hydroxides, more particularly LDH and LSH, in which the monovalent metallic cation selected is $Li^+$, the divalent metallic cations $M2^{2+}$ selected are from the group consisting of $Zn^{2+}$, $Mg^{2+}$, $Ca^{2+}$, $Cu^{2+}$, $Ni^{2+}$, $Co^{2+}$, $Fe^{2+}$, $Mn^{2+}$, $Cd^{2+}$, $Pb^{2+}$, $Sr^{2+}$, and mixtures thereof, preferably $Zn^{2+}$, $Mg^{2+}$, $Ca^{2+}$, $Fe^{2+}$, $Mn^{2+}$, and mixtures thereof, very preferably $Zn^{2+}$ and/or $Mg^{2+}$, more particularly $Zn^{2+}$, and the trivalent metallic cations $M3^{3+}$ selected are from the group consisting of $Al^{3+}$, $Bi^{3+}$, $Fe^{3+}$, $Cr^{3+}$, $Ga^{3+}$, $Ni^{3+}$, $Co^{3+}$, $Mn^{3+}$.

The preparation of layered hydroxides is conventional. Reference may be made, for example, to E. Kanezaki, Preparation of Layered Double Hydroxides, in Interface Science and Technology, Vol. 1, Chapter 12, page 345 ff.—Elsevier, 2004, ISBN 0-12-088439-9, in which, for example, various methods for producing LDH are described. Further information concerning the synthesis of LDH is described in, for example, D. G. Evans et. al., "Preparation of Layered Double Hydroxides", Struct. Bond. (2006) 119, pages 89-119 [DOI 10.1007/430_006. Springer Berlin Heidelberg 2005] or else Poul et al., Chem. Mater., 2000, 12 (10), 3123-3132.

Layered hydroxides, more particularly LDH and LSH, may be prepared, for example, from mixtures of inorganic salts of the metallic cations to be incorporated into the layered hydroxides, while observing the requisite and/or desired proportions (stoichiometries) of monovalent, divalent, and trivalent metallic cations, in aqueous phase, at defined, basic pH levels which are kept constant. Where the synthesis takes place in the presence of carbon dioxide, as for example under atmospheric conditions and/or by addition of carbonates, the LDH generally comprise carbonate as intercalated anion. The reason for this is the high affinity of carbonate, already described earlier on above, for intercalation into the layer structure of the LDH. If operation takes place with exclusion of carbon dioxide and carbonates (for example, atmosphere of inert nitrogen or argon gas, non-carbonate-containing salts, carbonate-free water), the LDH comprise the inorganic anions of the metal salts, chloride ions for example, as intercalated anions.

The synthesis may be carried out in principle in the absence also of carbon dioxide (inert gas atmosphere) and/or carbonate, and additionally in the presence of, for example, organic anions or their acidic precursors which are not present as anion in the metal salts. In that case the product is generally a mixed hydroxide intercalating the organic anions in question.

Through the aforementioned method, then, referred to as the direct coprecipitation method, the desired layered hydroxides are obtained in a one-step synthesis.

It is known to be possible as well to perform the preparation by what is called the alcohol route (see, for example, Poul et al., Chem. Mater., 2000, 12 (10), 3123-3132). In this case, in principle, first of all, by dissolution of an inorganic salt or of a mixture of inorganic salts of the metallic cations to be incorporated into the layered hydroxides, with compliance with the requisite and/or desired proportions (stoichiometries), an alcoholic solution of these salts in ethanol or 2-butoxyethanol, for example, is prepared. For the purpose of dissolution of the salts, the mixture may be stirred at room temperature or elevated temperature, according to solubility relationships. This is followed in principle by the addition of basic aqueous solution, again accomplishing the preparation of the hydroxides.

Likewise possible is the preparation of layered hydroxides, more particularly LDH and LSH, by the method known as the reconstruction method. In this case, for example, existing LDH in powder form are heated for a number of hours at several hundred degrees Celsius (for example, 3 hours at 450° C.). The LDH structure collapses, and volatile and/or thermally decomposable intercalated anions and also the water of crystallization are able to escape. As a result of the extreme treatment, the carbonate, for example, breaks down, and carbon dioxide and water escape. What is left is, for example, an amorphous mixture of metal oxides. By addition of aqueous solutions of the anions to be intercalated, under an inert gas atmosphere, the LDH structure is re-established, and the desired LDH are produced.

So as to miss nothing out, reference may also be made to what is called the anionic exchange reaction method. Exploited in this instance is the capacity of the LDH to exchange intercalated anions. The layer structure of the cationic mixed metal hydroxide layers in the LDH is retained. To start with, LDH already prepared, such as LDH prepared by the coprecipitation method under an inert gas atmosphere, comprising anions which are readily exchangeable in comparison to carbonate, such as chloride or nitrate, are suspended in an aqueous alkaline solution under an inert gas atmosphere. This slurry or suspension is then added, under an inert gas atmosphere, to an aqueous alkaline solution of the organic anions to be intercalated, and the combined system is stirred for a certain time, during which the aforesaid anionic exchange takes place. The anionic exchange reaction method, then, is not a true preparation method for LDH in the sense of the present invention, but rather a method with which LDH that have already been prepared are modified. In particular, it does not involve preparation or temporary destruction of the typical layer structure of layered hydroxides.

In the context of the present invention, the layered hydroxides are prepared in the presence of the polyester (A). The layered hydroxides in this case are prepared preferably by the direct coprecipitation method or the alcohol route, very preferably by the alcohol route.

This therefore means that during the preparation of the layered hydroxides, there is at least one polyester (A), preferably just one polyester (A), present in the same reaction vessel as the reactants used or required for preparing the layered hydroxides. In this case the polyester (A) may be present from the start in the respective reaction vessel. In other words, the polyester is introduced initially, for example, and the reactants for preparing layered hydroxides are added—that is, in particular, inorganic metal salts and also, preferably, a reaction medium such as water or, in the context of the alcohol route, an alcohol. Or else the reactants and the reaction medium, preferably water or, in the context of the alcohol route, an alcohol such as ethanol or 2-butoxyethanol are introduced as an initial charge, and then the polyester (A) is added subsequently, but before the layered hydroxides are prepared. Also possible is the initial introduction of some of the reactants, then the addition of the polyester (A), and subsequently the addition of the remainder of the reactants. Another possibility is for all of the reactants and also the polyester (A) to be transferred into the reaction medium simultaneously.

It has surprisingly emerged that in the manner described not only is it possible to prepare LDH, but also that compositions prepared in this way exhibit good fine division of LDH. This means, therefore, that the LDH have a significantly lower tendency toward agglomeration, resulting in the advantages described at the outset. The LDH and/or the compositions of the invention may also be prepared without the further addition of inorganic or organic anions or their acidic precursors. This means, therefore, that apart from the anions present in the metal salts used as reactants, and from the hydroxide ions present fundamentally in basic and aqueous reaction media used advantageously for the synthesis, there are no other typical anions present. Without wishing to be bound to any particular theory, it appears that the carboxy-functional polyester (A), whose carboxyl functions are deprotonated in the basic, aqueous reaction medium (or which is used in the form of an ammonium salt), appears to be at least partly incorporated into the interlayers of the layered hydroxides, as a likewise anionic molecule. From this standpoint, therefore, the polyester and/or the carboxylate groups may likewise be regarded as reactants for the preparation of LDH. Surprisingly, therefore, in spite of the polymeric character of the polyester (A), not only is the fundamental synthesis of the layered hydroxides successful, but these layered hydroxides are in fact also finely divided.

In the context of the present invention it has emerged that the use of the direct coprecipitation method already identified above can be considered as being advantageous. It is of advantage here for the metal salts to be used for preparing the layered hydroxides, or a part of the metal salts, to be added dropwise in the form of an aqueous solution to an initial charge composed of an aqueous, basic solution comprising polyester (A) or polyester (A) and the remaining metal salts, under an inert gas atmosphere, in other words with exclusion of oxygen or with exclusion of atmospheric conditions, and at the same time to keep the pH constant by controlled addition of a base, as for example sodium hydroxide solution or ammonium hydroxide. The reaction medium may of course also include other components. Examples might be residual fractions of typical organic solvents that are obtained in the synthesis of the polyester, or other inorganic and/or organic anions. In order to achieve a controlled and effective crystallization, the metal salt solutions are advantageously added dropwise slowly, in other words, depending on concentrations and amounts of the solutions to be added dropwise and the solutions to be introduced as an initial charge, over the course of about 1 to 10 hours, more particularly 2 to 5 hours. Full dropwise addition is then followed advantageously by aging or further stirring of the suspension for about 1 hour up to 10 days, more particularly for between 2 and 24 hours, in order to ensure maximum conversion (effective crystallization) and a satisfactory fine division.

The pH selected when preparing the layered hydroxides by the direct coprecipitation method is advantageously from greater than 7 to 12 and is kept constant throughout the synthesis. Depending on the desired composition (choice of the metallic cations $M^{2+}/M^{3+}$, for example), there is generally an optimum pH, which can be easily adapted by the skilled person. Ranges of pH value that are preferred in principle, however, are between 8 and 11.

Having emerged as even more preferred in the context of the present invention is the application of the alcohol route. This means that it is preferable to prepare the LDH in the presence of the polyester (A) in a basic reaction medium comprising at least one alcohol. Preferred alcohols are ethanol and 2-butoxyethanol, more particularly 2-butoxyethanol. The reaction medium is basic, in order to allow the preparation of the hydroxides from the metal salts. The reaction medium preferably comprises a mixture of an alcohol and water, in which case the weight ratio of alcohol to water is preferably from 1.0 to 5.0, more particularly 1.5 to 3.0, and the alcohol is therefore preferably in excess. The basic character of the reaction medium is achieved preferably by addition of a basic aqueous solution to the alcohol or to a mixture of water and alcohol.

In one particularly preferred embodiment, first of all an inorganic salt or a mixture of inorganic salts of the metallic cations to be incorporated into the layered hydroxides is dissolved in an alcoholic solution comprising at least one polyester (A), while observing the requisite and/or desired proportions (stoichiometries). To dissolve the salts, the mixture may be stirred at room temperature or elevated temperature of preferably 60 to 90° C., according to solubility relationships. This is followed by the addition of water and the establishment of the basic pH. Then, advantageously, there is aging or further stirring of the suspension over a period of for example 1 hour up to 10 days, more particularly of between 2 and 24 hours, in order to ensure maximum conversion and a satisfactory fine division.

During the preparation of the layered hydroxides it is of course possible for further anions to be present as well, in addition to the polyester (A), the anions present in the metal salts, and the hydroxide ions present in any case in the basic, aqueous reaction medium. For example, if not operating under inert gas, carbonate may at least proportionally be present, and may therefore also be incorporated into the LDH. It is also possible for other inorganic or organic anions to be present during the preparation. It is, however, advantageous if no further anions are present. This means that no further anions are included apart from the anions present as a result of the metal salts, the polyester (A), and the hydroxide ions that are present in any case.

As metal salts for preparing the layered hydroxides it is possible to use salts that are arbitrary per se. Preferred salts comprise not only the preferred metal cations, in other words the monovalent metallic cation $Li^+$, the divalent metallic cations $M2^{2+}$ selected from the group consisting of $Zn^{2+}$, $Mg^{2+}$, $Ca^{2+}$, $Cu^{2+}$, $Ni^{2+}$, $Co^{2+}$, $Fe^{2+}$, $Mn^{2+}$, $Cd^{2+}$, $Pb^{2+}$, $Sr^{2+}$, and mixtures thereof, preferably $Zn^{2+}$, $Mg^{2+}$, $Ca^{2+}$, and mixtures thereof, very preferably $Zn^{2+}$ and/or $Mg^{2+}$, more particularly $Zn^{2+}$, and trivalent metallic cations $M3^{3+}$ selected from the group consisting of $Al^{3+}$, $Bi^{3+}$, $Fe^{3+}$, $Cr^{3+}$, $Ga^{3+}$, $Ni^{3+}$, $Co^{3+}$, and $Mn^{3+}$, but also anions selected from the group consisting of carbonate, nitrate, sulfate, chloride, hydroxide, oxide, and acetate, preferably hydroxide and acetate.

With particular advantage, however, no carbonates are used as metal salts, in order thereby to prevent the primary incorporation of carbonate.

As base for establishing the basic pH it is possible likewise to use components that are arbitrary per se and are known to the skilled person. Reference may be made, for example, to sodium hydroxide solution and ammonium hydroxide.

In one especially preferred embodiment, the metal salts and the bases are selected such that after the composition of the invention has been prepared, there are no longer any extraneous components, originating from the metal salts and bases, in the composition, or else these extraneous components are such that they can be removed from the composition in a simple way by evaporation operations and without costly and inconvenient washing operations.

If extraneous components of these kinds are not removed, they may in turn rise give to incompatibilities in, for example, coating materials, with the only remaining consequence, often, being that of costly and inconvenient purification. Examples of extraneous components not easy to remove include nitrates, chlorides, and sulfates, which remain in the composition after preparation, in the form of sodium chloride, for example, and can also not be removed by distillation.

An example of a component readily removable by evaporation operations is ammonia, which as a result of its known low vapor pressure can be removed simply by gentle increase in the temperature of the composition of the invention to 40 to 60° C., for example. Similar considerations apply in respect of acetic acid, which originates from the use of metal acetates. The acetic acid as well will escape no later than during the curing of a coating composition comprising the compositions of the invention, and it will therefore not remain as an extraneous component in the system. No extraneous components which originate from metal salts are left behind, for example, if hydroxides and/or oxides are employed as metal salts.

Surprisingly, in spite of the nitrates, sulfates and/or chlorides that are employed exclusively or proposed very predominantly in the literature for the acceptable preparation of layered hydroxides, it has emerged that in the presence of the polyester (A) there is no need for these salts and that in spite of this layered hydroxides are obtained. Through the use of the alcohol route, in particular, compositions which comprise finely divided layered hydroxides are achieved even when the stated preferred metal salts and bases are employed.

For the preparation of the layered hydroxides, particularly by the direct precipitation method, accordingly, the present invention prefers the use as metal salts of hydroxides, acetates, and oxides of the aforementioned preferred metals, and of ammonium hydroxide as base.

The compositions of the invention comprise at least one layered hydroxide (B) in a particularly well-pronounced state of fine division, and also the polyester (A). Besides these components there may also be further components present; more particularly, water is present preferably as solvent. The compositions of the invention, then, are preferably aqueous compositions.

The compositions of the invention are accordingly very suitable as coating materials or for producing coating materials, especially those based on polymeric binders, examples being primers, surfacers, and aqueous basecoat materials. This means that the compositions of the invention, depending on further constituents already present or on constituents still to be added, are suitable as coating materials or for producing such coating materials. Accordingly, the use of the composition of the invention as coating material is also provided by the present invention. In this case the compositions, more particularly the layered hydroxides present, are able to bring about their advantageous properties such as, for example, improving the corrosion control and/or increasing the mechanical resistance, more particularly stonechip resistance, and/or the controlled influencing of optical properties. At the same time, however, the deleterious agglomeration effect is prevented or significantly reduced, and so the adverse characteristics associated with it, such as the production of a partly inhomogeneous coating film, can be prevented. It is also possible to prevent the incompatibilities resulting from the efflorescence of anions, while at the same time the agglomeration is prevented and the LDH can be combined with (potentially) anionic polymeric binders. The coating materials produced from the compositions of the invention, or the compositions of the invention used as coating materials, generally comprise further, typical coatings constituents in addition to the polyester (A), the LDH, and preferably water. These constituents may more particularly be typical crosslinking agents, further, typical polymeric binders, which may contain (potentially) anionic groups or else may be free from these groups, and also further typical coatings additives, and organic solvents.

The purpose of the text below is to illustrate the invention with examples.

Examples

All of the measurement data reported in the examples were obtained unless otherwise specified by the methods of determination stated in the general description.

1. Preparation of Polyesters for Inventive Use 1.1 Preparation of a First Polyester (A) (A-1)

A polyester (A) is prepared as follows. Into a reactor with anchor stirrer, nitrogen inlet, and water separator with overhead temperature measurement facility and top-mounted packed column with reflux condenser, 44.40 g of fully hydrogenated bisphenol-A, 7.07 g of cyclohexane-1,2-dicarboxylic anhydride, 23.41 g of dimeric fatty acid (Pripol®1012, from Unichema, based on unsaturated C18 fatty acid derivatives with a dimer content of at least 97 wt %, a trimer content of not more than 1 wt %, monomer content no more than traces) are introduced. The contents of the reactor are heated at 190 degrees C. under a nitrogen atmosphere and with stirring until the reaction mixture has obtained an acid number of 8-12 mg KOH/g. The overhead temperature ought not to exceed 100° C. After 9 days, an acid number of 11.4 mg KOH/g is obtained, and the reaction mixture is cooled. 1.7 ml of water from the condensation reaction are collected. The yield is 72.7 g of solid resin. The resin possesses an OH number of 143 mg KOH/g, a mass-average molecular weight of 1884 g/mol, and a number-average molecular weight of 753 g/mol.

27 g of 2-butanone are added to the resin melt of the resulting polyester, heated at 80° C., and this composition is dissolved with stirring in a reactor with anchor stirrer, nitrogen inlet, and reflux condenser, and 35.7 g of 2-octenylsuccinic anhydride (0.9 equivalent relative to the molar amount of hydroxyl groups in the polyester (B1) used) are added. The mixture is heated to 95 degrees C. in a nitrogen atmosphere, and is stirred at this temperature at reflux for 18 hours. The clear, colorless solution thus obtained possesses a nonvolatile fraction of 68.4 wt % (fraction of the polyester (A)). The acid number is 97 mg KOH/g. The resin possesses an OH number of 18 mg KOH/g, a weight-average molecular weight of 2218 g/mol, and a number-average molecular weight of 1181 g/mol.

The water separator is replaced by a distillation bridge, and the polyester solution is admixed dropwise with 10.19 g of N,N-dimethylamino-2-ethanol with stirring and under nitrogen at 95° C., corresponding to a degree of neutralization of 0.95 of the carboxyl groups, determined via the acid number, in the latterly obtained polyester. Added to the resin solution, after cooling to 80° C., at a mass flow rate of 2 g per minute are 60 g of deionized water (room temperature), followed at 80° C., with stirring and under reduced pressure, by the distillative removal of a 2-butanone/water mixture until the residual 2-butanone content of the remaining polyester solution has reached <0.5 wt % (determined via gas-chromatographic analysis). The aqueous polyester solution obtained possesses a nonvolatile fraction of 72.3 wt %, an acid groups content of 1.60 meq/g, a base content of 1.48 meq/g, and a 2-butanone content of 0 wt %.

1.2 Preparation of a Second Polyester (A) (A-2)

Into a reactor with anchor stirrer, nitrogen inlet, reflux condenser, and distillation bridge, 10.511 g of 1,6-hexanediol, 9.977 g of 2,2-dimethyl-1,3-propanediol, 6.329 g of cyclohexane-1,2-dicarboxylic anhydride, 23.410 g of dimeric fatty acid (Pripol® 1012, from Unichema, dimer content of at least 97 wt %, trimer content not more than 1 wt %, monomer content no more than traces), and 0.806 g of cyclohexane are introduced. The contents of the reactor are heated with stirring and under a nitrogen atmosphere at 220 degrees C. until the reaction mixture has an acid number to DIN EN ISO 3682 of 8 to 12 mg KOH/g of nonvolatile fraction and a viscosity of 3.7 to 4.2 dPas (measured as an 80 wt % solution of the reaction mixture in 2-butoxyethanol at 23 degrees C. in a cone/plate viscometer from ICI). Thereafter the cyclohexane is removed by distillation, and the reaction mixture is cooled to 160 degrees C.

The reaction mixture is subsequently admixed with 10.511 g of 1,2,4-benzenetricarboxylic anhydride, and then heated to 160 degrees C. and held at this temperature until the resulting polyester has an acid number to DIN EN ISO 3682 of 38 mg KOH/g of nonvolatile fraction, a hydroxyl number to DIN EN ISO 4629 of 81 mg KOH/g of nonvolatile fraction, a weight-average molecular weight Mw of about 19 000 daltons (determined by means of gel permeation chromatography in accordance with the standards DIN 55672-1 to -3 with polystyrene as standard), and a viscosity of 5.0 to 5.5 dPas (measured as a 50 wt % solution of the reaction mixture in 2-butoxyethanol at 23 degrees C. in a cone/plate viscometer from ICI).

The reaction mixture is cooled to 130 degrees C., and 2.369 g of N,N-dimethylamino-2-ethanol are added. After further cooling to 95 degrees C., 17.041 g of deionized water and 19.046 g of 2-butoxyethanol are added. The resulting dispersion is adjusted to a pH of 7.4 to 7.8 and to a nonvolatile fraction of 60 wt %, by addition of further N,N-dimethylamino-2-ethanol and deionized water.

2. Production of Inventive Compositions Comprising Layered Hydroxides (B) and Polyesters (A)

2.1 Preparation of the Double Hydroxide $Zn_2Al(OH)_6$* $(CH_3CO_2)$ in the Presence of Polyester (A-1) (Composition I1)

3.00 g of the solution of polyester (A-1) obtained under 1.1, 0.137 g (0.846 mmol) of basic aluminum acetate $Al(OH)(CH_3CO_2)_2$, and 0.3712 g (0.169 mmol) of zinc acetate dihydrate, corresponding to a Zn/Al ratio of 2, and also 25.9 ml of 2-butoxyethanol are heated to 70° C. in an oil bath and with stirring in a 100 ml three-neck flask equipped with magnetic stirrer and a reflux condenser. After 90 minutes, with stirring, 11.4 ml of deionized water are added and the pH of the mixture is adjusted to a value of eight with a 30 percent strength aqueous solution of ammonium hydroxide. The mixture is stirred at 70° C. overnight and then cooled to room temperature in an oil bath. The mixture is centrifuged at 4500 rpm for 10 minutes, the liquid is discarded and the product is isolated.

2.2 Preparation of the Double Hydroxide $Zn_2Al(OH)_6$* $(CH_3CO_2)$ in the presence of polyester (A-2) (Composition I2)

The procedure is exactly the same as that of experiment 2.1. Instead of 3.00 g of the solution of polyester (A-1) obtained under 1.1, 3.00 g of the dispersion of polyester (A-2) obtained under 1.2 are used.

2.3 Preparation of the Single Hydroxide $Zn_5(OH)_8$* $(CH_3CO_2)$ (LSH) in the Presence of Polyester (A-1) (Composition I3)

3.00 g of the solution of polyester (A-1) obtained under 1.1 and 0.533 g (2.43 mmol) of zinc acetate dihydrate and also 13.37 ml of 2-butoxyethanol are mixed at room temperature and with stirring in a 100 ml three-neck flask equipped with magnetic stirrer and a reflux condenser. After 90 minutes, with stirring, 5.89 ml of deionized water are added and the pH of the mixture is adjusted to a value of eight with a 30 percent strength aqueous solution of ammonium hydroxide. The mixture is stirred at room temperature overnight, and then centrifuged at 4500 rpm for 10 minutes, the liquid is discarded and the product is isolated.

2.4 Preparation of the Single Hydroxide $Zn_5(OH)_8$* $(CH_3CO_2)$ (LSH) in the Presence of Polyester (A-2) (Composition I4)

The procedure is exactly the same as that of experiment 2.3. Instead of 3.00 g of the solution of polyester (A-1) obtained under 1.1, 3.00 g of the dispersion of polyester (A-2) obtained under 1.2 are used.

3. Production of Noninventive Compositions Comprising Layered Hydroxides (B) and Polyesters (A)

3.1 Preparation of the Double Hydroxide $Zn_2Al(OH)_6$* $(CH_3CO_2)$ (LDH1)

1.370 g (8.46 mmol) of basic aluminum acetate $Al(OH)(CH_3CO_2)_2$ and 3.712 g (16.9 mmol) of zinc acetate dihydrate, corresponding to a Zn/Al ratio of 2, and also 259 ml of 2-butoxyethanol are heated to 80° C. in an oil bath and with stirring in a 500 ml three-neck flask equipped with magnetic stirrer and a reflux condenser. After 90 minutes, with stirring, 50 ml of deionized water are added and the pH of the mixture is adjusted to a value of eight with a 30 percent strength aqueous solution of ammonium hydroxide. The mixture is stirred at 80° C. overnight and then cooled to room temperature in an oil bath. The mixture is centrifuged at 4500 rpm for 10 minutes, the liquid is discarded and the product is stirred three times into 50 ml portions of deionized water, and centrifuged at 4500 rpm for 10 minutes. The aqueous paste obtained has an LDH content of 13.79 weight %.

3.2 Preparation of the Single Hydroxide $Zn_5(OH)_8$ $(CH_3CO_2)$ (LSH1)

5.328 g (24.3 mmol) of zinc acetate dihydrate and also 134 ml of 2-butoxyethanol are weighed out in a 250 ml three-neck flask equipped with magnetic stirrer and a reflux condenser. After 90 minutes of stirring, at room temperature and with stirring, 59 ml of deionized water are added and the pH of the mixture is adjusted to a value of eight with a 30 percent strength aqueous solution of ammonium hydroxide. The mixture is stirred at room temperature overnight and thereafter centrifuged at 4500 rpm for 10 minutes, the liquid is discarded and the product is stirred three times into 50 ml portions of deionized water, and centrifuged at 4500 rpm for 10 minutes. The aqueous paste obtained has an LSH content of 12.12 weight %.

3.3 Production of the Mixtures Comprising Polyesters (A) and Layered Hydroxides (B)

Physical mixtures of the pastes described under 3.1 and 3.2 comprising layered hydroxides (B) and also the aqueous mixtures described under 1.1 and 1.2 comprising polyesters (A) were produced in plastic beakers by stirring together in each case one hydroxide (B) and one polyester (A) by means of a spatula and under ambient conditions. Stirring continues until the mixtures present can be seen to be homogeneous (typically five to ten minutes). The initial masses in the experiments are given in Table 1.

TABLE 1

Comparative compositions comprising polyesters (A) and layered hydroxides (B)

| Example | C1 | C2 | C3 | C4 |
|---|---|---|---|---|
| Polyester A-1 (1.1) | 3.845 g | 2.294 g | | |
| Polyester A-2 (1.2) | | | 3.845 g | 1.969 g |
| LDH-1 (3.1) | | 1.66 g | | 1.426 g |
| LSH-1 (3.2) | 3.168 g | | 3.168 g | |

The mass ratios of layered hydroxide to polymer based on the nonvolatile fractions of the pastes or solutions are shown in Table 2 by comparison with the calculated mass ratios for the corresponding inventive examples.

The calculation of the masses of the layered hydroxides is based on the assumption of a 100% conversion in line with the reported empirical formulae in examples 2 and 3, with no account taken of intercalated and adsorbed water.

TABLE 2

Mass ratios of the layered hydroxides to polymer in the comparative compositions by comparison with the analogous mass ratios of the corresponding inventive examples Examples, comparison of mass ratios

| | Comparative examples | | | |
|---|---|---|---|---|
| | C1 | C2 | C3 | C4 |
| $m_{(hydroxide)}/m_{(polymer)}$ | 0.138 | 0.138 | 0.166 | 0.166 |

| | Inventive examples | | | |
|---|---|---|---|---|
| | I3 | I1 | I4 | I2 |
| $m_{(hydroxide)}/m_{(polymer)}$ | 0.13 | 0.125 | 0.157 | 0.15 |
| $m_{(LSH, LDH)}$, 100% conversion, no $H_2O$ [g] | 0.283 | 0.27 | 0.283 | 0.27 |
| $m_{(polymer)}$ [g] | 2.169 | 2.169 | 1.8 | 1.8 |

4. Characterization of the Inventive Compositions and Comparative Compositions by Means of X-Ray Diffraction Table 3 provides another overview of the systems under investigation, relating to the components (A) and (B) they contain. Within the inventive systems I, the layered hydroxides were prepared in the presence of a polyester (examples 2.1 to 2.4, compositions I1 to I4). In the comparative systems, the layered hydroxides were prepared separately first, after which the polyester was added (compositions C1 to C4).

TABLE 3

Systems investigated

| I1 | I2 | I3 | I4 | C1 | C2 | C3 | C4 |
|---|---|---|---|---|---|---|---|
| Polyester (A-1) | | Polyester (A-1) | | Polyester (A-1) | Polyester (A-1) | | |
| | Polyester (A-2) | | Polyester (A-2) | | | Polyester (A-2) | Polyester (A-2) |
| LDH (Zn/Al) | LDH (Zn/Al) | | | | LDH (Zn/Al) | | LDH (Zn/Al) |
| | | LSH (Zn) | LSH (Zn) | LSH (Zn) | | LSH (Zn) | |
| FIG. 3 | FIG. 4 | FIG. 5 | FIG. 6 | FIG. 7 | FIG. 8 | FIG. 9 | FIG. 10 |

The compositions I1 to I4 and C1 to C4 were investigated using the Siemens D501 instrument. In addition, the hydroxides LDH1 (example 3.1) and LSH1 (example 3.2) were investigated without the addition of a polyester. The samples were applied to a glass support, using a spatula. The primary beam was the Cu Kα emission ($\lambda$=1.5406 Å) from a copper tube (excitation: 35 kV at 30 mA). The scattered radiation was recorded in the 2 theta angle range from 2-70° (0.08° step width, four seconds' measuring time per stage).

The scattering curves obtained (intensity against the 2 theta scattering angle) are shown in FIGS. 1 to 10 (see also correlation in Table 3 for FIGS. 3 to 10). The "correlated reflections for the layering of the hydroxides", listed for individual examples, are obtained from the Bragg condition for the diffraction of X-rays:

$$n \cdot \lambda = 2d \cdot \sin\theta \text{ where:}$$

n=diffraction order (natural number)
$\lambda$=wavelength of X-radiation
d=spacing of the lattice planes (here, of the layers)
$\theta$=angle between X-ray and lattice planes (layers)

The samples of the pure layered hydroxides LDH1 (example 3.1) and LSH1 (example 3.2) show intensive correlated reflections for layering of the hydroxides (00l) at positions 6.84°, 13.72°, 21° (LDH1) and 6.49°, 13.03°, 19.94° (LSH1), corresponding to layer spacings d of 13.68 Å (LDH1) and of 12.98 Å (LSH1). Typical reflections for layered hydroxides at scattering angles around 35° and also 60° stand for cation spacings within the layers (0kl) and (hk0), respectively.

The compositions in which the layered hydroxides have been prepared in the presence of a polyester (A) (in situ systems) show the reflections at high scattering angles (around 35° and also 60°), whereas the observations in the investigated small-angle range are of no reflections (00l) (in the case of I2 and I4) or of new correlated reflections in the case of relatively small scattering angles (in the case of I1 and I3). The mixture I1 exhibits four correlated reflections (3.59°, 5.38°, 7.20°, 9.12°), corresponding to a layer spacing d of 49 Å. For I3, five correlated reflections are detected (3.87°, 5.77°, 7.65°, 9.58°, 11.5°), corresponding to a layer spacing d of 46 Å. There are therefore exfoliated layers (in the presence of the polyester (A-2), systems I2 and I4) or layers intercalacted (i.e., expanded) with polyester, in the presence of the polyester (A-1) (systems I1 and I3). The latter systems have a greater layer spacing as compared with the acetate-containing hydroxides (LDH1 and LSH1). LDH and LSH with such individualized or highly separated layers represent suitable starting materials for producing nanocomposites. The layered hydroxides in these systems are finely distributed.

In contrast, the scattering curves for the physical mixtures of the layered single hydroxide LSH1 (examples C1 and C3) indicate that there is no intercalation, let alone exfoliation, of the layers as a result of the effect of a polyester (A). The correlated reflections for the layering correspond to those of the acetate-containing hydroxide LSH1 employed.

In the case of the layered double hydroxide LDH1 in the presence of the polyester A-2 (system C4), only small differences are observed from the hydroxide prepared in situ. The layered double hydroxide LDH1 intercalates polyester A-1 (example C2), since seven correlated reflections are observed for the layering (3.55°, 6.93°, 10.31°, 13.85°, 17.32°, 20.86°, 24.15°), corresponding to a layer spacing d of 26 Å. This expansion of the layer spacing is therefore much less pronounced than in the in situ systems.

CONCLUSION

The experiments show that the preparation of layered hydroxides in the presence of polyesters (A) makes it possible to obtain individualized (exfoliated) or highly separated (intercalated) layers of layered hydroxides. In contrast, physical mixtures of the layered hydroxides prepared ex situ and the polymers (A) only sporadically exhibit exfoliation or intercalation, the latter in association with a considerably reduced layer expansion. The compositions of the invention are therefore structurally different from the compositions of the prior art. Moreover, this difference is linked to a technical advantage. The described effect of the fine distribution is especially pronounced for the preferred polyesters (A) (shown here with reference to the polyester (A-1)).

Figure 1:
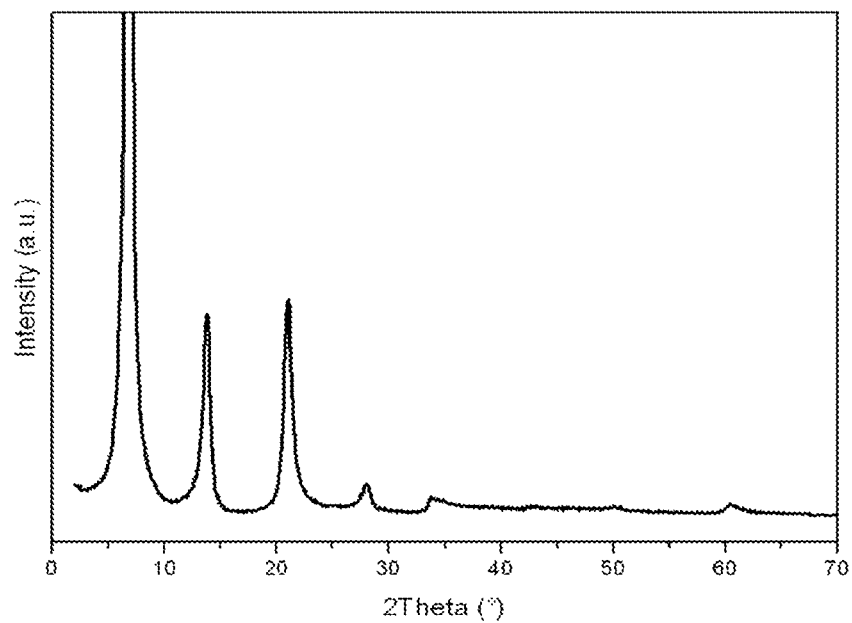
FIG. 1:
Scattering curve of LDH as per example 3.1.
Figure 2:
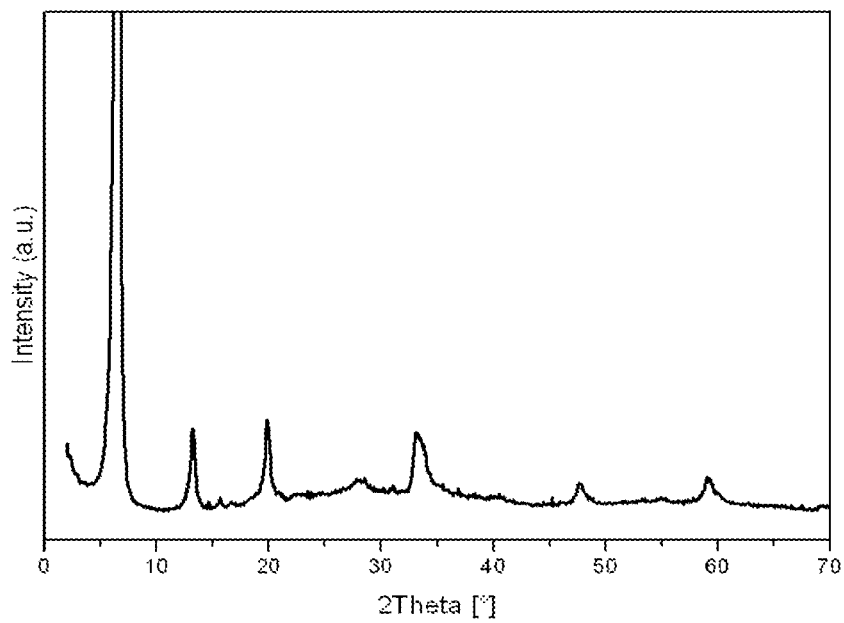
FIG. 2:
Scattering curve of LDH as per example 3.2.
Figure 3:
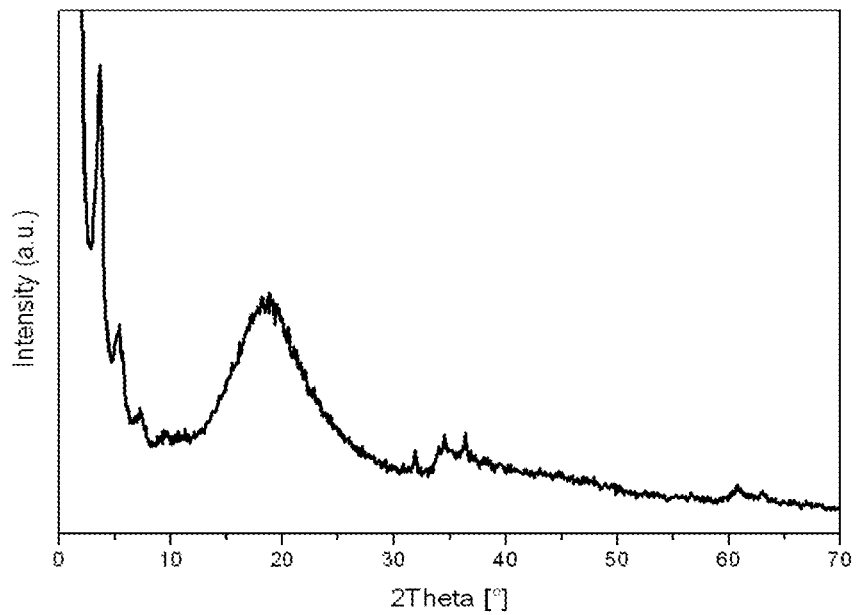
FIG. 3:
Scattering curve of composition I1.
Figure 4:
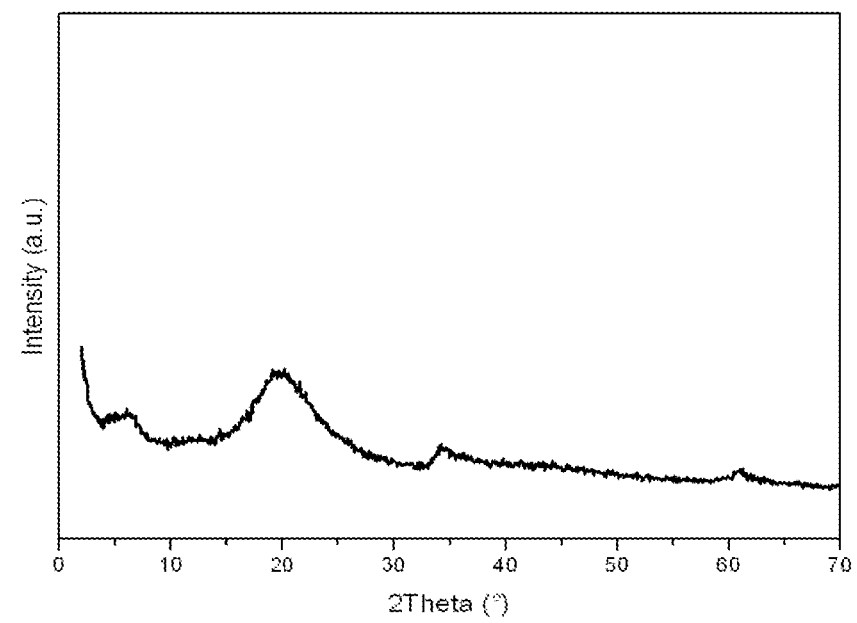
FIG. 4:
Scattering curve of composition I2.
Figure 5:
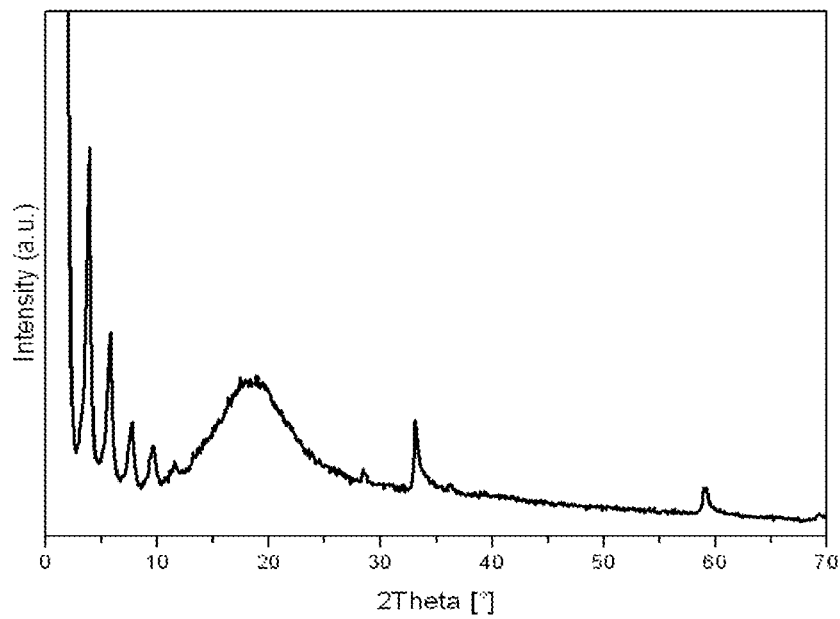
FIG. 5:
Scattering curve of composition I3.
Figure 6:
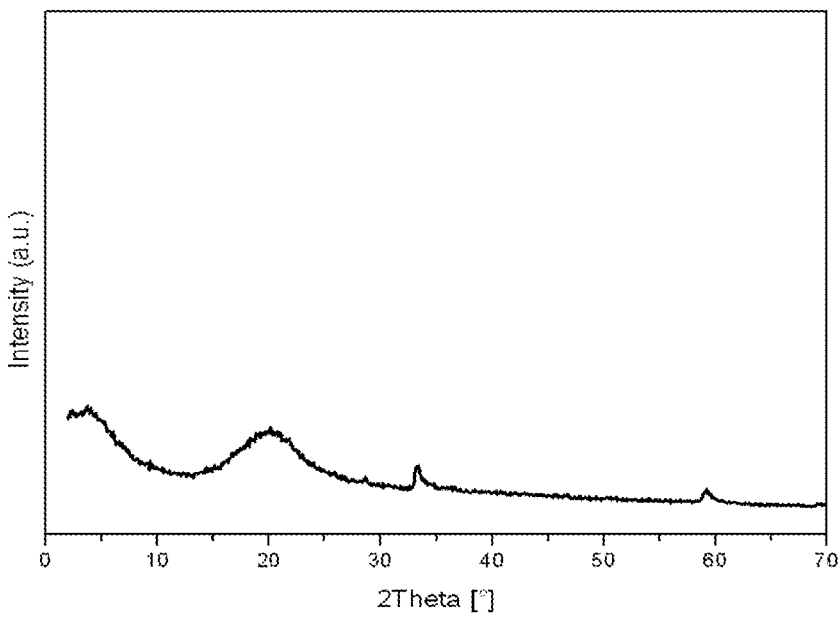
FIG. 6:
Scattering curve of composition I4.
Figure 7:
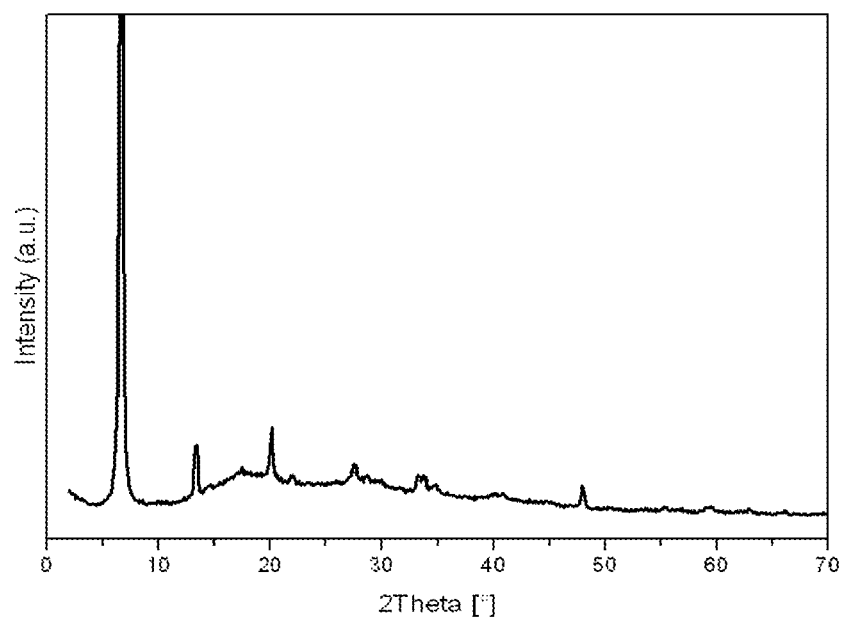
FIG. 7:
Scattering curve of composition C1.
Figure 8:
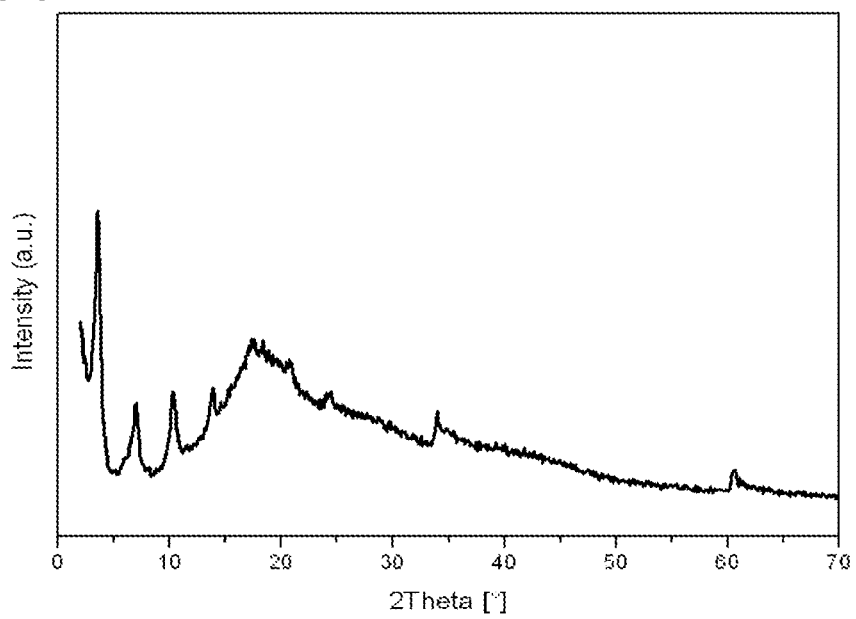
FIG. 8:
Scattering curve of composition C2.
Figure 9:
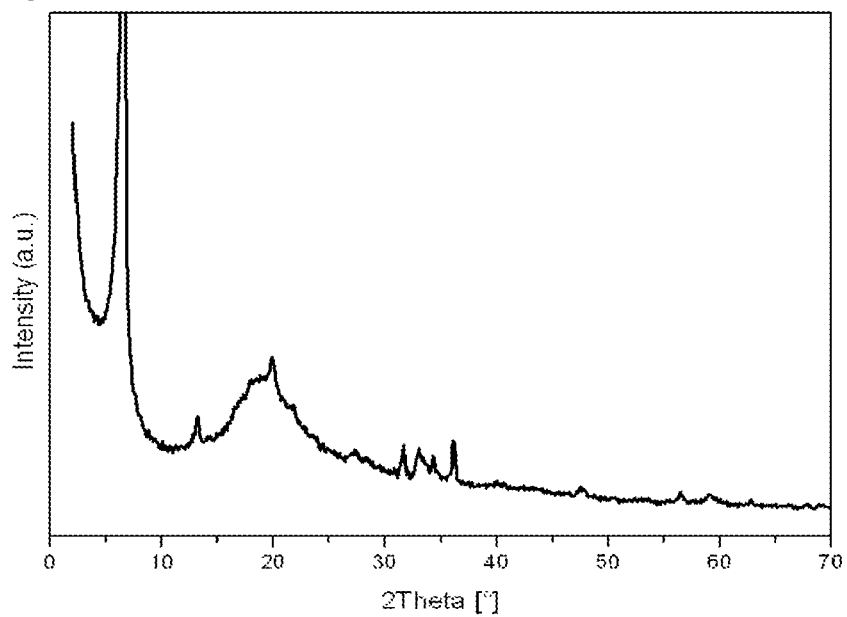
FIG. 9:
Scattering curve of composition C3.
Figure 10:
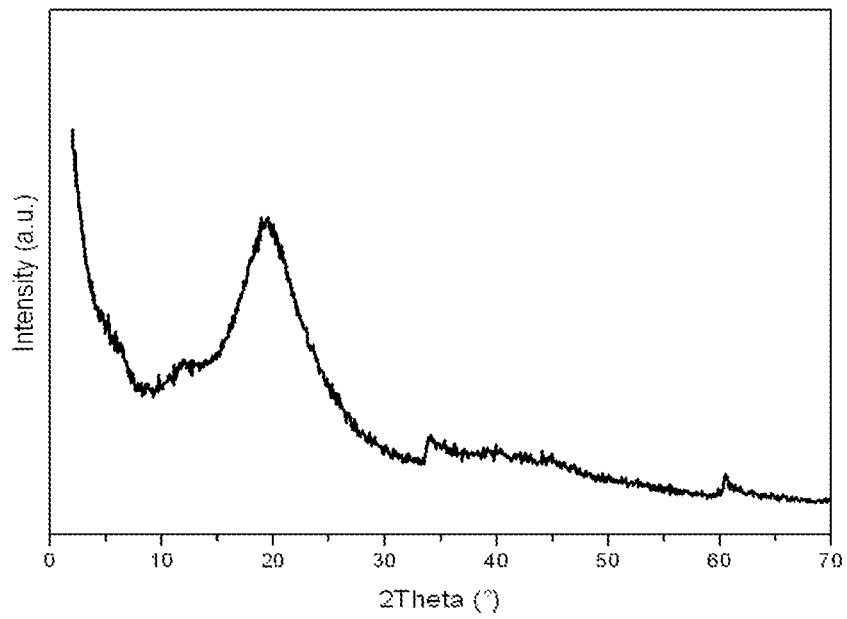
FIG. 10:
Scattering curve of composition C4.

The invention claimed is:
1. A composition comprising
(A) at least one carboxy-functional polyester having an acid number of from 20 to 250 mg KOH/g, obtained by polymerizing monomers that comprise at least one difunctional monomer (a1) with aliphatic groups having 12 to 70 carbon atoms between the functional groups,
and also
(B) at least one synthetic layered hydroxide,
wherein the at least one layered hydroxide (B) is prepared in the presence of the polyester (A).

2. The composition as claimed in claim 1, wherein the aliphatic groups of the at least one monomer (a1) polymerized to obtain the polyester (A) have 13 to 50 carbon atoms.

3. The composition as claimed in claim 1, wherein the at least one monomer (a1) is at least one selected from the group consisting of fully hydrogenated bisphenols, dimeric aliphatic fatty alcohols, and dimeric aliphatic fatty acids.

4. The composition as claimed in claim 1, wherein the acid number of the polyester (A) is in the range from 25 to 150 mg KOH/g.

5. The composition as claimed in claim 1, wherein the at least one layered hydroxide (B) is at least one selected from the group consisting of layered double hydroxides and layered single hydroxides.

6. The composition as claimed in claim 5, wherein the layered hydroxide comprises at least one metallic cation selected from the group consisting of $Li^+$, $Zn^{2+}$, $Mg^{2+}$, $Ca^{2+}$, $Cu^{2+}$, $Ni^{2+}$, $Co^{2+}$, $Fe^{2+}$, $Mn^{2+}$, $Cd^{2+}$, $Pb^{2+}$, $Sr^{2+}$, $Al^{3+}$, $Bi^{3+}$, $Fe^{3+}$, $Cr^{3+}$, $Ga^{3+}$, $Ni^{3+}$, $Co^{3+}$ and $Mn^{3+}$.

7. The composition as claimed in claim 1, wherein at least 5 mol % of monomers in polyester (A) are the at least one difunctional monomer (a1).

8. The composition as claimed in claim 1, wherein the at least one layered hydroxide is prepared in a basic reaction medium comprising at least one alcohol and optionally water.

9. The composition as claimed in claim 1, wherein the layered hydroxide is obtained from a metal salt and a base in a process that leaves no extraneous components originating from the metal salts and bases remaining in the composition, or a process that also produces at least one extraneous component capable of removal from the composition by evaporating and without washing.

10. The composition as claimed in claim 9, wherein the metal salt is a hydroxide, acetate, oxide, or combination thereof, and wherein the base is ammonium hydroxide.

11. The composition as claimed in claim 1, further comprising at least one crosslinking agent, at least one polymeric binder other than the polyester (A), and/or at least one organic solvent.

12. The composition as claimed in claim 1, which is an aqueous coating material which comprises at least one polymeric binder other than the polyester (A), having anionic groups.

13. A process for producing the composition as claimed in claim 1, the process comprising preparing the at least one layered hydroxide (B) in the presence of the polyester (A).

14. A coating, comprising the composition as claimed in claim 1.

15. A method, comprising coating a substrate with the coating of claim 14.

16. The composition of claim 1, wherein a scattering curve of the composition shows reflections at scattering angles of 35° and also 60°.

17. The composition of claim 1, wherein the at least one synthetic layered hydroxide comprises exfoliated layers or layers intercalated with the at least one polyester.

* * * * *

UNITED STATES PATENT AND TRADEMARK OFFICE
CERTIFICATE OF CORRECTION

PATENT NO. : 10,125,269 B2
APPLICATION NO. : 15/304400
DATED : November 13, 2018
INVENTOR(S) : Horst Hintze-Bruening et al.

It is certified that error appears in the above-identified patent and that said Letters Patent is hereby corrected as shown below:

In the Specification

In Column 2, Line 14, delete "[A.nH$_2$O]." should read -- [A⁻.nH$_2$O]. --, therefor.

In Column 22, Line 45, delete "(00l)" should read -- (001) --, therefor.

In Column 22, Line no 63, to Column 23, Line nos. 1-5, delete "There are therefore exfoliated layers (in the presence of the polyester (A-2), systems I2 and I4) or layers intercalacted (i.e., expanded) with polyester, in the presence of the polyester (A-1) (systems I1 and I3). The latter systems have a greater layer spacing as compared with the acetate-containing hydroxides (LDH1 and LSH1). LDH and LSH with such individualized or highly separated layers represent suitable starting materials for producing nanocomposites. The layered hydroxides in these systems are finely distributed." should read the same on Column 22, Line 64, after "spacing d of 46 Å." as a new paragraph.

In Column 22, Line 65, delete "intercalacted" should read -- intercalated --, therefor.

In the Claims

In Column 24, Line 15 (approx.), Claim 4, after "is" delete "in the range".

Signed and Sealed this
First Day of October, 2019

Andrei Iancu
*Director of the United States Patent and Trademark Office*